United States Patent
Hotta et al.

(10) Patent No.: US 11,336,213 B2
(45) Date of Patent: May 17, 2022

(54) MOTOR CONTROL DEVICE

(71) Applicant: SANDEN AUTOMOTIVE COMPONENTS CORPORATION, Isesaki (JP)

(72) Inventors: Masafumi Hotta, Isesaki (JP); Daisuke Hirono, Isesaki (JP)

(73) Assignee: Sanden Automotive Components Corporation, Isesaki (JP)

(*) Notice: Subject to any disclaimer, the term of this patent is extended or adjusted under 35 U.S.C. 154(b) by 0 days.

(21) Appl. No.: 16/969,516

(22) PCT Filed: Jan. 21, 2019

(86) PCT No.: PCT/JP2019/002607
§ 371 (c)(1),
(2) Date: Aug. 12, 2020

(87) PCT Pub. No.: WO2019/167505
PCT Pub. Date: Sep. 6, 2019

(65) Prior Publication Data
US 2020/0403540 A1 Dec. 24, 2020

(30) Foreign Application Priority Data
Feb. 28, 2018 (JP) .............................. JP2018-035437

(51) Int. Cl.
*H02P 6/182* (2016.01)
*H02P 6/185* (2016.01)
*H02P 6/20* (2016.01)

(52) U.S. Cl.
CPC .............. *H02P 6/182* (2013.01); *H02P 6/185* (2013.01); *H02P 6/20* (2013.01)

(58) Field of Classification Search
CPC ............ H02P 6/182; H02P 6/185; H02P 6/20
See application file for complete search history.

(56) References Cited

U.S. PATENT DOCUMENTS

2014/0049201 A1  2/2014  Hirono
2019/0074781 A1*  3/2019  Tsukamoto ............. H02P 6/182

FOREIGN PATENT DOCUMENTS

JP  2009-290980 A  12/2009
JP  2012-228127 A  11/2012
JP  2017-169329 A  9/2017

OTHER PUBLICATIONS

Japan Patent Office, International Search Report issued in International Application No. PCT/JP2019/002607, dated Mar. 26, 2019.

* cited by examiner

*Primary Examiner* — Cortez M Cook
(74) *Attorney, Agent, or Firm* — Baker Botts L.L.P.

(57) ABSTRACT

Provided is a motor control device having a function for determining a rotor position of a synchronous motor, without use of a sensor, the device prevents obtaining an erroneous rotor position, to enable stable control of the synchronous motor based on the rotor position in both the normal-control region and the flux-weakening-control region. The motor control device 1 includes: a first rotor position determining unit 19 that determines a rotor position of the synchronous motor 2 based on a current electrical angle, and a first current phase obtained from a current peak value and a difference between an induced voltage electrical angle and a current electrical angle; a second rotor position determining unit 20 that determines the rotor position of the synchronous motor 2 based on the current electrical angle, and a second current phase obtained from a flux linkage and the current peak value; and a selecting unit 21 that selects the first rotor position determining unit 19 or the second rotor position determining unit 20, based on the current peak value, and the first current phase or the second current phase.

2 Claims, 7 Drawing Sheets

MOTOR CONTROL DEVICE

CROSS-REFERENCE TO RELATED APPLICATIONS

This application is a U.S. National Stage Patent Application under 35 U.S.C. § 371 of International Patent Application No. PCT/JP2019/002607, filed on Jan. 21, 2019, which claims the benefit of Japanese Patent Application No. 2018-035437, filed on Feb. 28, 2018, the disclosures of each of which are incorporated herein by reference in their entirety.

TECHNICAL FIELD

The present invention relates to motor control devices having functions for determining rotational positions of rotors (hereinafter, simply referred to as "rotor positions") of synchronous motors, without the use of sensors.

BACKGROUND ART

As an example of such a motor control device, a motor control device disclosed in Patent Document 1 is known. The motor control device disclosed in Patent Document 1 includes: a current-peak-value-and-electrical-angle determining unit that detects a current peak value and a current electrical angle based on a current flowing through a stator coil of a synchronous motor; an induced-voltage-peak-value-and-electrical-angle determining unit that determines an induced voltage peak value and induced voltage electrical angle based on the current flowing through the stator coil and a voltage applied to the stator coil; a flux linkage determining unit that determines a flux linkage of a rotor of the synchronous motor based on the induced voltage peak value and a rotational speed of the synchronous motor; a first rotor position determining unit and a second rotor position determining unit that determine a rotor position of the synchronous motor; and a selecting unit that selects one of the first rotor position determining unit and the second rotor position determining unit.

The first rotor position determining unit determines the rotor position by using a first rotor position calculation equation with, as parameters, the current electrical angle, and a first current phase obtained based on the current peak value and [(induced voltage electrical angle)−(current electrical angle)]. The second rotor position determining unit determines the rotor position by using a second rotor position calculation equation with, as parameters, the current electrical angle, and a second current phase obtained based on the current peak value and the flux linkage. The selecting unit selects the first rotor position determining unit in the normal-control region, and selects the second rotor position determining unit in the flux-weakening-control region. Specifically, the selecting unit selects the first rotor position determining unit when the current (current peak value) is less than or equal to a predetermined value, whereas the selecting unit selects the second rotor position determining unit when the current (current peak value) exceeds the predetermined value.

REFERENCE DOCUMENT LIST

Patent Document

Patent Document 1: JP 2017-169329 A

SUMMARY OF THE INVENTION

Problem to be Solved by the Invention

Figure 10:
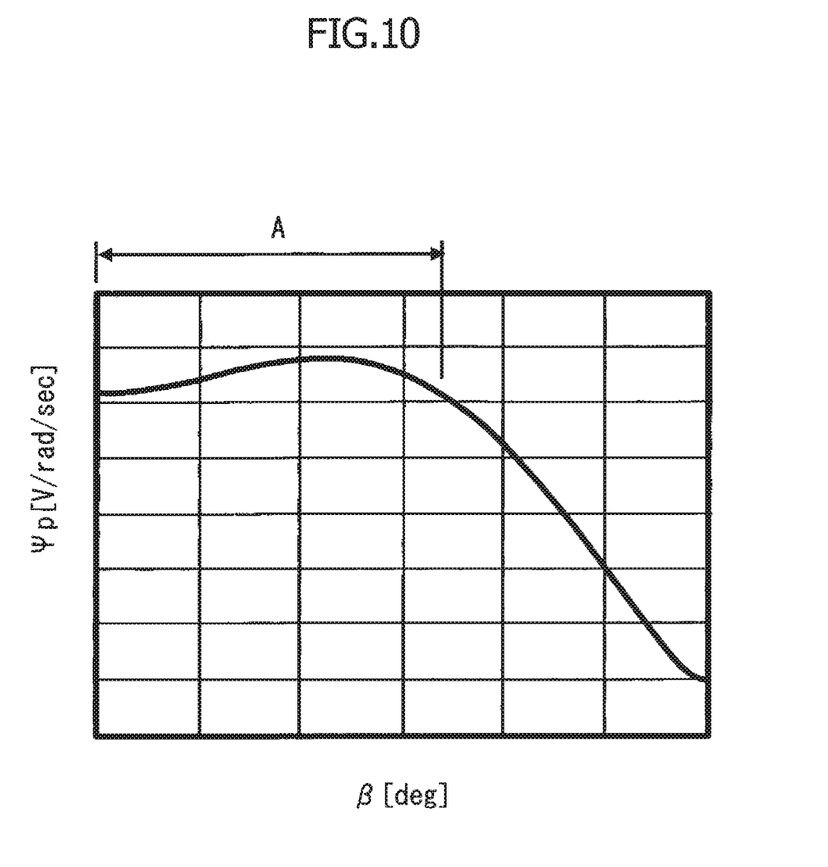
FIG. 10 is a diagram for explaining a problem that may occur in a conventional motor control device, showing the relationship between current phase $\beta$ and flux linkage $\Psi p$ when a current peak value is high.

FIG. 10 is a diagram illustrating an example of the relationship between flux linkage $\Psi p$ and current phase $\beta$ in the conventional motor control device, when the current peak value is high. As shown in FIG. 10, when the current peak value is high, two current phases $\beta$ correspond to one flux linkage $\Psi p$ in an area indicated by arrow A. This indicates that there may be a case in which current phase $\beta$ (i.e., second current phase) cannot be stably obtained by the second rotor position determining unit, and ultimately, there may be a case in which the rotor position cannot be stably determined.

Thus, in the abovementioned conventional motor control device in which the second rotor position determining unit is selected only when the current (current peak value) exceeds the predetermined value, there is concern that an erroneous rotor position (including a rotor position in an undetectable state) may be obtained. The erroneous rotor position may make control of the synchronous motor unstable or make the synchronous motor uncontrollable. Thus, it is desired to prevent obtaining such an erroneous rotor position.

Therefore, an object of the present invention is to provide a motor control device that prevents obtaining an erroneous rotor position and enables stable control of the synchronous motor based on the rotor position in both the normal-control region and the flux-weakening-control region.

Means for Solving the Problem

According to one aspect of the present invention, a motor control device includes:

a current determining unit that determines a current flowing through a stator coil of a synchronous motor;

an applied voltage determining unit that determines an applied voltage applied to the stator coil;

a current-peak-value-and-electrical-angle determining unit that determines a current peak value and a current electrical angle based on a current determined by the current determining unit;

an induced-voltage-peak-value-and-electrical-angle determining unit that determines an induced voltage peak value and an induced voltage electrical angle based on a current determined by the current determining unit and an applied voltage determined by the applied voltage determining unit;

a flux linkage determining unit that determines a flux linkage of a rotor of the synchronous motor based on the induced voltage peak value and a rotational speed of the synchronous motor;

a first rotor position determining unit that determines a rotor position of the synchronous motor based on the current electrical angle, and a first current phase obtained from the current peak value and a difference between the induced voltage electrical angle and the current electrical angle;

a second rotor position determining unit that determines a rotor position of the synchronous motor based on the current electrical angle, and a second current phase obtained from the flux linkage and the current peak value; and a selecting unit that selects the first rotor position determining unit or the second rotor position determining unit, based on the current peak value, and the first current phase or the second current phase.

Effects of the Invention

In the motor control device, the selecting unit is configured to select the first rotor position determining unit or the second rotor position determining unit, based on the current peak value, and the first current phase or the second current phase. That is, the selecting unit selects the first rotor position determining unit or the second rotor position determining unit, considering not only the amount of current, but also the phase of current. This allows the selecting unit to appropriately select the first rotor position determining unit or the second rotor position determining unit, and more specifically, this allows switching from the first rotor position determining unit to the second rotor position determining unit, or switching from the second rotor position determining unit to the first rotor position determining unit, to be appropriately performed, so that it is possible to prevent obtaining an erroneous rotor position. This provides a stable and accurate determination of rotor position in both the normal-control region and the flux-weakening-control region, so that it is possible to stably control the synchronous motor.

MODE FOR CARRYING OUT THE INVENTION

Hereinbelow, an embodiment of the present invention will be described with reference to the accompanying drawings.

Figure 1:
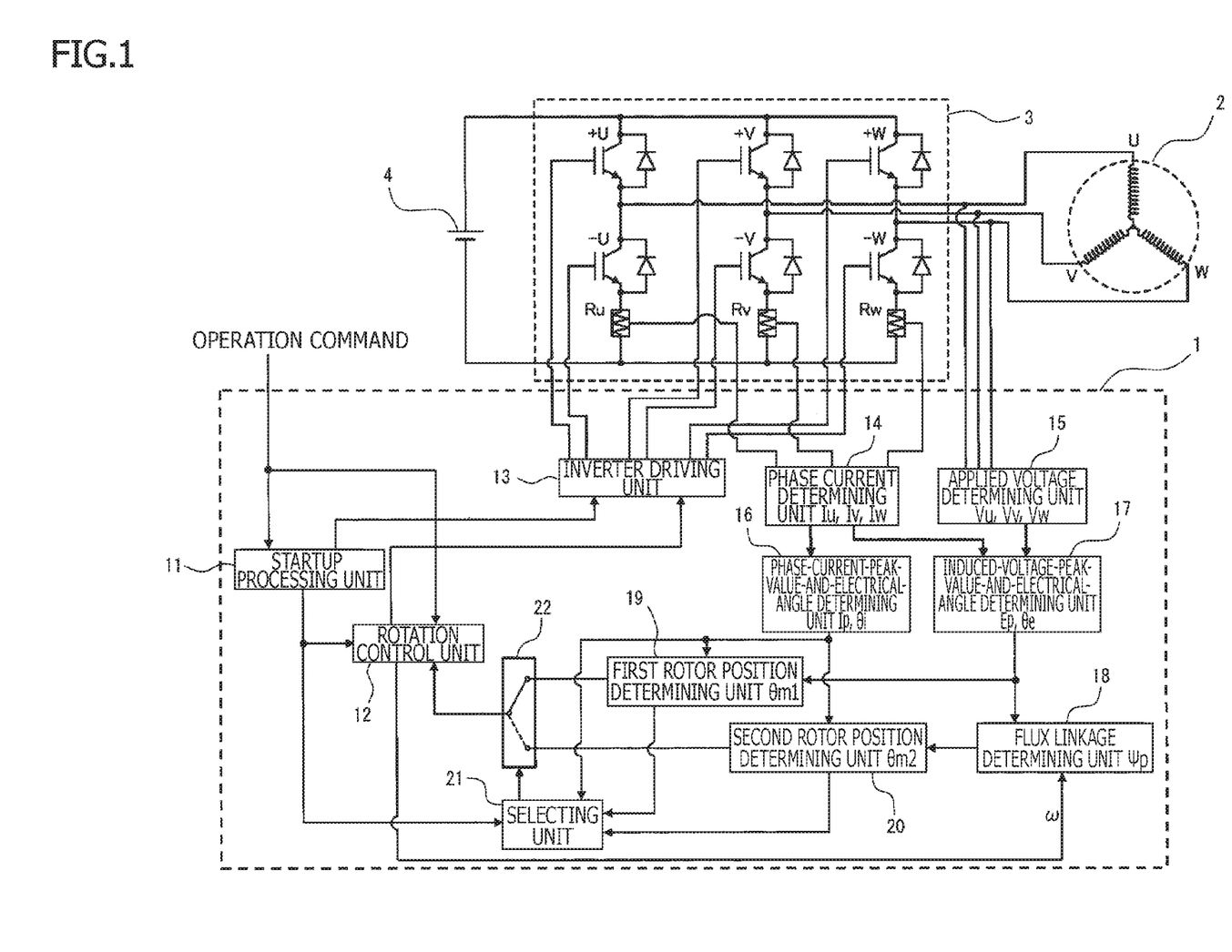
FIG. 1 is a block diagram of a motor control device according to an embodiment of the present invention.

FIG. 1 is a block diagram of a motor control device according to an embodiment of the present invention. A motor control device 1 according to an embodiment has a function for determining a rotor position of a synchronous motor 2, without the use of a sensor. Furthermore, the motor control device 1 is mainly configured to control an inverter 3, and the inverter 3 is configured to convert direct-current power from a direct-current power supply 4 into alternating-current power, to supply the converted power to the synchronous motor 2.

The synchronous motor 2 is a three-phase star connected motor having a stator including U-, V-, and W-phase stator coils, and a rotor including a permanent magnet. Only U-, V-, and W-phase stator coils are shown in the figures, and the remainder is not shown. Although a star-connected motor is illustrated as an example, a delta connection may be equally applicable.

In the inverter 3, upper arm switching elements +U, +V, +W and lower arm switching elements −U, −V, −W are connected in series between the high-level side and the low-level side of the direct-current power supply 4 in each of the U-, V-, and W-phases. On the low-level side of the lower arm switching elements −U, −V, −W, shunt resistors Ru, Rv, Rw for determining current flowing through each phase are provided.

The motor control device 1 includes a startup processing unit 11, a rotation control unit 12, an inverter driving unit 13, a phase current determining unit (current determining unit) 14, an applied voltage determining unit 15, a phase-current-peak-value-and-electrical-angle determining unit (current-peak-value-and-electrical-angle determining unit) 16, an induced-voltage-peak-value-and-electrical-angle determining unit 17, a flux linkage determining unit 18, a first rotor position determining unit 19, a second rotor position determining unit 20, and a selecting unit 21. In the present embodiment, each process, described later, executed in the rotation control unit 12, the phase current determining unit 14, the applied voltage determining unit 15, the phase-current-peak-value-and-electrical-angle determining unit 16, the induced-voltage-peak-value-and-electrical-angle determining unit 17, and the flux linkage determining unit 18, is repeated at predetermined time intervals.

The startup processing unit 11 executes a startup process of the synchronous motor 2 when receiving an operation command, including a target rotational speed, from the exterior while the synchronous motor 2 is stopped. In the present embodiment, the startup processing unit 11 activates the synchronous motor 2, and outputs a first control signal for gradually increasing rotational speed co at a predetermined acceleration to the inverter driving unit 13. The first control signal includes a startup voltage instruction and a startup voltage phase instruction. Then, for example, the startup processing unit 11 determines that the startup is completed when rotational speed co of the synchronous motor 2 reaches a predetermined rotational speed that is lower than the target rotational speed, and the startup processing unit 11 outputs a startup completion signal to the rotation control unit 12 and the selecting unit 21, to end the startup process.

When receiving the startup completion signal output from the startup processing unit 11, the rotation control unit 12 executes normal control. Thereby, the starting process is shifted to the normal control. In the present embodiment, the rotation control unit 12 generates a second control signal for rotating the synchronous motor 2 at the target rotational speed based on the operation command, received from the exterior, and rotor position $\theta m$, and outputs the second control signal to the inverter driving unit 13. The second control signal includes a voltage instruction and a voltage phase instruction. Furthermore, as described later, rotor position $\theta m$ is rotor position $\theta m$ determined by the first rotor position determining unit 19 (i.e., first rotor position $\theta m1$), or is rotor position $\theta m$ determined by the second rotor position determining unit 20 (i.e., second rotor position θm2). Furthermore, when receiving an operation stop command from the exterior, the rotation control unit 12 stops outputting the second control signal, to stop the synchronous motor 2.

The inverter driving unit 13 drives each of the switching elements +U to −W of the inverter 3 to be turned on and off based on the first control signal from the startup processing unit 11 or the second control signal from the rotation control unit 12, to perform sine wave energization (180-degree energization) to each of U-, V-, and W-phase stator coils.

The phase current determining unit 14 determines U-phase current Iu flowing through the U-phase stator coil, V-phase current Iv flowing through the V-phase stator coil, and W-phase current Iw flowing through the W-phase stator coil by measuring voltage applied to the shunt resistors Ru, Rv, Rw.

The applied voltage determining unit 15 determines U-phase applied voltage Vu, V-phase applied voltage Vv, and W-phase applied voltage Vw, applied to the corresponding U-, V-, and W-phase stator coils from the corresponding upper arm switching elements +U to +W.

The phase-current-peak-value-and-electrical-angle determining unit 16 determines phase current peak value Ip and phase current electrical angle θi based on phase currents Iu, Iv, Iw determined by the phase current determining unit 14. A determining method of phase current peak value Ip and phase current electrical angle θi is as follows.

Figure 2:
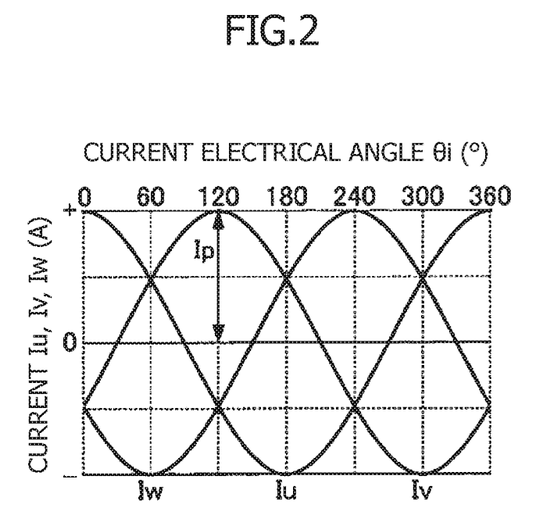
FIG. 2 is a phase current waveform diagram when sine wave energization is performed.

FIG. 2 is a phase current waveform diagram when sine wave energization is performed to the U-, V-, and W-phases. Phase differences among U-, V-, and W-phase currents Iu, Iv, Iw, each forming a sine waveform, are 120°. Referring to FIG. 2, the following Equations 1 hold among phase currents Iu, Iv, Iw, phase current peak value Ip, and phase current electrical angle θi. The phase-current-peak-value-and-electrical-angle determining unit 16 obtains phase current peak value Ip and phase current electrical angle θi by the following Equations 1, based on U-, V-, and W-phase currents Iu, Iv, Iw determined by the phase current determining unit 14.

$$Iu = Ip \times \cos(\theta i)$$

$$Iv = Ip \times \cos(\theta i - 2/3\pi)$$

$$Iw = Ip \times \cos(\theta i + 2/3\pi) \quad \text{Equations 1}$$

The induced-voltage-peak-value-and-electrical-angle determining unit 17 determines induced voltage peak value Ep and induced voltage electrical angle θe based on phase currents Iu, Iv, Iw, determined by the phase current determining unit 14, and applied voltages Vu, Vv, Vw, determined by the applied voltage determining unit 15. A determining method of induced voltage peak value Ep and induced voltage electrical angle θe is as follows.

Figure 3:
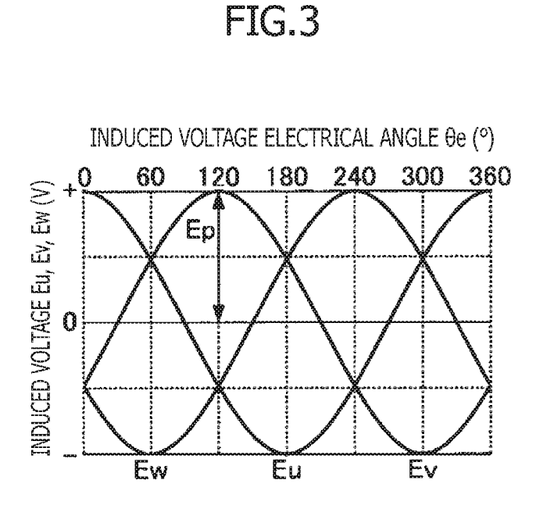
FIG. 3 is an induced voltage waveform diagram when sine wave energization is performed.

FIG. 3 is an induced voltage waveform diagram when sine wave energization is performed to the U-, V-, and W-phases. Phase differences among U-, V-, and W-phase induced voltages Eu, Ev, Ew, each forming a sine waveform, are 120°. Referring to FIG. 3, the following Equations 2 hold among induced voltages Eu, Ev, Ew, induced voltage peak value Ep, and induced voltage electrical angle θe.

$$Eu = Ep \times \cos(\theta e)$$

$$Ev = Ep \times \cos(\theta e - 2/3\pi)$$

$$Ew = Ep \times \cos(\theta e + 2/3\pi) \quad \text{Equations 2}$$

On the other hand, the following Equations 3 hold among applied voltages Vu, Vv, Vw, phase currents Iu, Iv, Iw, resistances Rcu, Rcv, Rcw of the stator coils (known as motor parameters), and induced voltages Eu, Ev, Ew.

$$Vu - Iu \times Rcu = Eu$$

$$Vv - Iv \times Rcv = Ev$$

$$Vw - Iw \times Rcw = Ew \quad \text{Equations 3}$$

The induced-voltage-peak-value-and-electrical-angle determining unit 17 obtains U-, V-, and W-phase induced voltages Eu, Ev, Ew by Equations 3 based on U-, V-, and W-phase currents Iu, Iv, Iw, determined by the phase current determining unit 14, and U-, V-, and W-phase applied voltages Vu, Vv, Vw, determined by the applied voltage determining unit 15, and then, obtains induced voltage peak value Ep and induced voltage electrical angle θe by Equations 2 based on the obtained U-, V-, and W-phase induced voltages Eu, Ev, Ew.

The flux linkage determining unit 18 determines flux linkage Ψp (=Ep/ω) of the rotor based on induced voltage peak value Ep, determined by the induced-voltage-peak-value-and-electrical-angle determining unit 17, and rotor rotational speed ω, received from the rotation control unit 12. Rotor rotational speed ω is determined (calculated) by the rotation control unit 12 by dθm/dt.

The first rotor position determining unit 19 determines rotor position θm based on phase current peak value Ip and phase current electrical angle θi, determined by the phase-current-peak-value-and-electrical-angle determining unit 16, and induced voltage electrical angle θe, determined by the induced-voltage-peak-value-and-electrical-angle determining unit 17. Specifically, the first rotor position determining unit 19 determines rotor position θm based on phase current electrical angle θi, and current phase β that is obtained from phase current peak value Ip and a difference between induced voltage electrical angle θe and phase current electrical angle θi, [(induced voltage electrical angle θe)−(phase current electrical angle θi)]. Herein, rotor position θm determined by the first rotor position determining unit 19 is referred to as "first rotor position θm1", and current phase β obtained from phase current peak value Ip and [(induced voltage electrical angle θe)−(phase current electrical angle θi)] is referred to as "first current phase β1".

Specifically, in the present embodiment, the first rotor position determining unit 19 determines first rotor position θm1 by using a first rotor position calculation equation (Equation 4, described below) with, as parameters, phase current electrical angle θi, and first current phase β1 obtained from phase current peak value Ip and [(induced voltage electrical angle θe)−(phase current electrical angle θi)].

$$\text{(First rotor position } \theta m1) = \text{(phase current electrical angle } \theta i) - \text{(first current phase } \beta 1) - 90° \quad \text{Equation 4}$$

First current phase β1 in Equation 4 is selected by referring to a data table TA. The data table TA is generated in advance and includes phase current peak value Ip and [(induced voltage electrical angle θe)−(phase current electrical angle θi)], as parameters. For example, the data table TA may be generated as follows, and stored in a memory.

Figure 4:
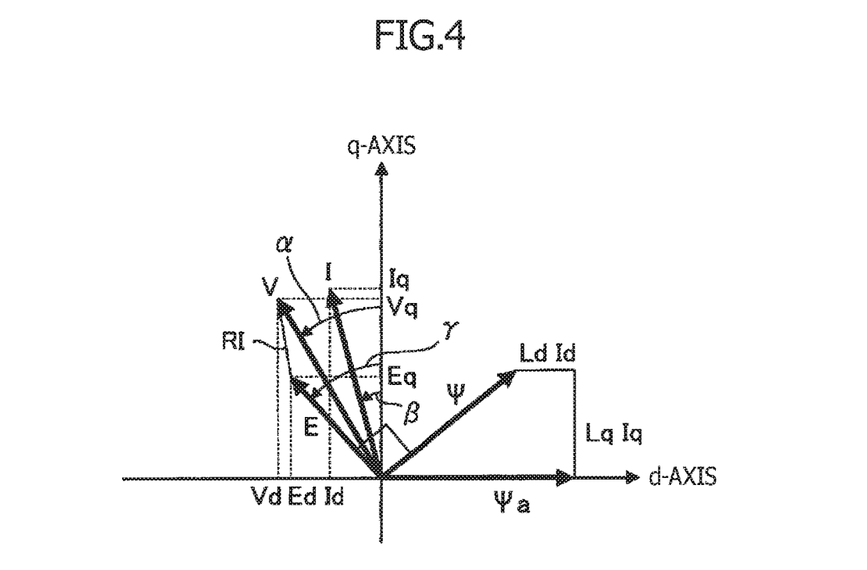
FIG. 4 is a motor vector diagram of a rotor coordinate system (d-q coordinate system).

FIG. 4 is a motor vector diagram when the rotor of the synchronous motor 2 is rotating. The diagram illustrates the relationships among applied voltage V (Vu to Vw), current I (Iu to Iw), and induced voltage E (Eu to Ew), expressed by vectors in d-q coordinate system. Induced voltage E is expressed by [ωΨ]. In FIG. 4, Vd is a d-axis component of applied voltage V, Vq is a q-axis component of applied voltage V, Id is a d-axis component of current I, Iq is a q-axis component of current I, Ed is a d-axis component of induced voltage E, and Eq is a q-axis component of induced voltage E. A voltage phase with respect to the q-axis is α, a current phase with respect to the q-axis is β, and an induced voltage phase with respect to the q-axis is γ. In the diagram, Ψa is a magnetic flux of a permanent magnet of the rotor, Ld is a d-axis inductance, Lq is a q-axis inductance, R is a resistance value of a stator coil (Rcu to Rcw), and Ψ is a flux linkage of the rotor.

The following Equation 5 can be derived by referring to FIG. 4, and this can be rewritten as the following Equation 6 by transposing values regarding ω from the right-hand side to the left-hand side of Equation 5.

$$\begin{pmatrix} Vd \\ Vq \end{pmatrix} = \begin{pmatrix} R & -\omega Lq \\ \omega Ld & R \end{pmatrix} \begin{pmatrix} Id \\ Iq \end{pmatrix} + \begin{pmatrix} 0 \\ \omega \Psi a \end{pmatrix} \quad \text{Equation 5}$$

$$\begin{pmatrix} Ed/\omega = (Vd - Id \times R)/\omega \\ Eq/\omega = (Vq - Iq \times R)/\omega \end{pmatrix} = \begin{pmatrix} 0 & -Lq \\ Ld & 0 \end{pmatrix} \begin{pmatrix} Id \\ Iq \end{pmatrix} + \begin{pmatrix} 0 \\ \Psi a \end{pmatrix} \quad \text{Equation 6}$$

The data table TA is generated in advance based on the fact that Equation 5 and Equation 6 hold in the motor vector diagram of FIG. 4. That is, the data table TA of current phase β (first current phase β1), including phase current peak value Ip corresponding to current I, and [(induced voltage electrical angle θe)−(phase current electrical angle θi)] corresponding to [(induced voltage phase γ)−(current phase β)], as parameters, is generated by storing current phases β at the time when [(induced voltage phase γ)−(current phase β)] becomes predetermined values while progressively increasing current phase β and current I, indicated in the motor vector diagram of FIG. 4, within predetermined ranges.

Specifically, for example, while increasing current phase β from −180° to 180° by 0.001° and increasing current I from 0 A to a maximum (here, 64 A) by 1 A, voltage phases α, current phases β, and induced voltage phases γ are obtained based on the motor vector diagram of FIG. 4, using intrinsic d- and q-axis inductances Ld, Lq of the synchronous motor 2. Then, current phases β at the time when [(induced voltage phase γ)−(current phase β)] becomes 1°, 2°, 3°, . . . , are stored for each current I. Thereby generated is the data table TA of current phase β (first current phase β1), including phase current peak value Ip corresponding to current I as a parameter, and [(induced voltage electrical angle θe)−(phase current electrical angle θi)] corresponding to [(induced voltage phase γ)−(current phase β)] as another parameter.

Then, the first rotor position determining unit 19 determines (calculates) first rotor position θm1 by inserting phase current electrical angle θi, and first current phase β1 that is selected from the data table TA depending on phase current peak value Ip and [(induced voltage electrical angle θe)−(phase current electrical angle θi)], into the abovementioned first rotor position calculation equation (Equation 4).

The second rotor position determining unit 20 determines rotor position θm based on phase current peak value Ip and phase current electrical angle θi, determined by the phase-current-peak-value-and-electrical-angle determining unit 16, and flux linkage Ψp, determined by the flux linkage determining unit 18. Specifically, the second rotor position determining unit 20 determines rotor position θm based on phase current electrical angle θi, and current phase β that is obtained from flux linkage Ψp and phase current peak value Ip. Herein, rotor position θm determined by the second rotor position determining unit 20 is referred to as "second rotor position θm2", and current phase β obtained from flux linkage Ψp and phase current peak value Ip is referred to as "second current phase β2".

Specifically, in the present embodiment, the second rotor position determining unit 20 determines second rotor position θm2 by using a second rotor position calculation equation (Equation 7, described below) with, as parameters, phase current electrical angle θi, and second current phase β2 obtained from flux linkage Ψp and phase current peak value Ip.

(Second rotor position θ*m*2)=(phase current electrical angle θ*i*)−(second current phase β2)−90°    Equation 7

Second current phase β2 in Equation 7 is selected by referring to a data table TB. The data table TB is generated in advanced and includes phase current peak value Ip and flux linkage Ψp as parameters. For example, the data table TB may be generated as follows, and stored in advance in a memory.

Similarly to the data table TA, the data table TB is also generated in advance based on the fact that Equation 5 and Equation 6 hold in the motor vector diagram of FIG. 4. That is, the data table TB of current phase β (second current phase β2), including phase current peak value Ip corresponding to current I and flux linkage Ψp determined by the flux linkage determining unit 18, corresponding to flux linkage Ψ, as parameters, is generated by storing current phases β at the time when flux linkage Ψ becomes predetermined values while progressively increasing current phase β and current I, indicated in the motor vector diagram of FIG. 4, within predetermined ranges.

Specifically, for example, while increasing current phase β from −180° to 180° by 0.001° and increasing current I from 0 A to a maximum (here, 64 A) by 1 A, current phases β and flux linkages Ψ are obtained. Then, current phase β corresponding to each flux linkage Ψ is stored for each current I. Thereby generated is the data table TB of current phase β (second current phase β2), including phase current peak value Ip corresponding to current I as a parameter, and flux linkage Ψp corresponding to flux linkage Ψ as another parameter.

Then, the second rotor position determining unit 20 determines (calculates) second rotor position θm2 by inserting phase current electrical angle θi, and second current phase β2 that is selected from the data table TB depending on phase current peak value Ip and flux linkage Ψp, into the abovementioned second rotor position calculation equation (Equation 7).

The selecting unit 21 selects the first rotor position determining unit 19 or the second rotor position determining unit 20 by appropriately controlling a switch 22. In the present embodiment, the selecting unit 21 is configured to select the first rotor position determining unit 19 or the second rotor position determining unit 20, based on phase current peak value Ip and current phase β (first current phase β1, second current phase β2). When the first rotor position determining unit 19 is selected, first rotor position θm1 determined by the first rotor position determining unit 19 is input into the rotation control unit 12 as rotor position θm, whereas when the second rotor position determining unit 20 is selected, second rotor position θm2 determined by the second rotor position determining unit 20 is input into the rotation control unit 12 as rotor position θm. The reason for selecting the first rotor position determining unit 19 or the second rotor position determining unit 20 in this way by the selecting unit 21, is to stably obtain current phase β, not only in the normal-control region, but also in the flux-weakeningcontrol region in which flux weakening control is performed, and ultimately, to stably determine rotor position θm.

Next, a process for selecting the first rotor position determining unit 19 or the second rotor position determining unit 20 performed by the selecting unit 21 will be described.

Figure 5:
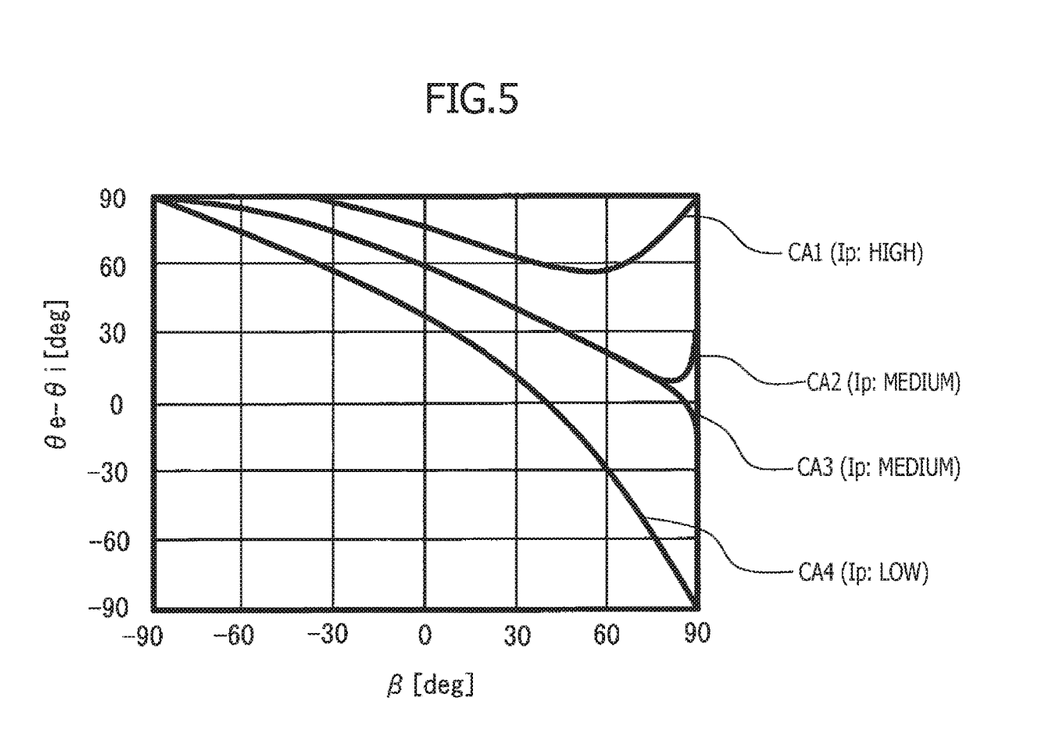
FIG. 5 is a diagram for explaining a data table used in a first rotor position determining unit, illustrating an example of the relationship between current phase $\beta$ and [(induced voltage electrical angle $\theta e$)–(phase current electrical angle $\theta i$)].
Figure 6:
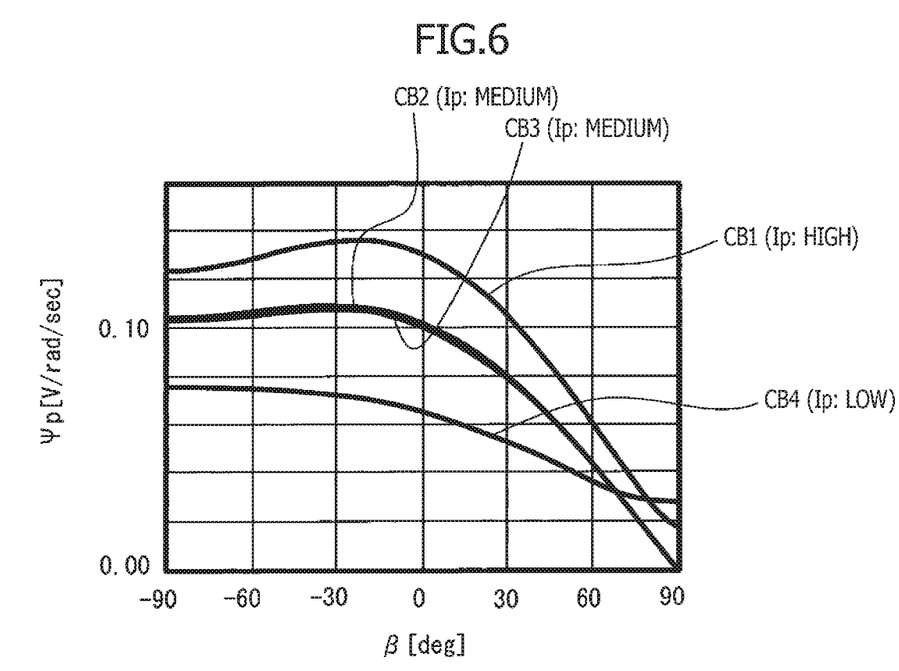
FIG. 6 is a diagram for explaining a data table used in a second rotor position determining unit, illustrating an example of the relationship between current phase $\beta$ and flux linkage $\Psi p$.

FIG. 5 is a diagram for explaining the data table TA used in the first rotor position determining unit 19, illustrating an example of the relationship between current phase β and [(induced voltage electrical angle θe)−(phase current electrical angle θi)]. FIG. 6 is a diagram for explaining the data table TB used in the second rotor position determining unit 20, illustrating an example of the relationship between current phase β and flux linkage Ψp.

In FIG. 5, curves CA1 to CA4, indicating the relationship between current phase β and [(induced voltage electrical angle θe)−(phase current electrical angle θi)], correspond to a part of the data table TA, and, in FIG. 6, curves CB1 to CB4, indicating the relationship between current phase β and flux linkage Ψp, correspond to a part of the data table TB. The curve CA1 in FIG. 5 and the curve CB1 in FIG. 6 indicate cases in which phase current peak value Ip is high (for example, Ip>50 A). The curves CA2 and CA3 in FIG. 5 and curves CB2 and CB3 in FIG. 6 indicate cases in which phase current peak value Ip is medium (for example, 30<Ip≤50 A). The curve CA4 of FIG. 5 and the curve CB4 of FIG. 6 indicate cases in which phase current peak value Ip is low (for example, Ip≤30 A).

Referring to FIG. 5, the curve CA1 indicating a case in which phase current peak value Ip is high has a stable tendency in a region in which current phase β is less than or equal to a first predetermined value (here, 30 degrees), so that it is possible to stably obtain current phase β corresponding to [(induced voltage electrical angle θe)−(phase current electrical angle θi)]. However, the curve CA1 has a point of change at which tendencies greatly change in a region in which current phase β exceeds the first predetermined value. Thus, in the region in which current phase β exceeds the first predetermined value, current phase β corresponding to [(induced voltage electrical angle θe)−(phase current electrical angle θi)] cannot be stably obtained (i.e., there is concern that erroneous current phase β may be obtained).

On the other hand, referring to FIG. 6, the curve CB1 indicating a case in which phase current peak value Ip is high has a stable tendency in a region in which current phase β is greater than or equal to a second predetermined value (<first predetermined value, here 0 degrees), so that it is possible to stably obtain current phase β corresponding to flux linkage Ψp. However, the curve CB1 has a point of change at which tendencies greatly change in a region in which current phase β is less than the second predetermined value. Thus, in the region in which current phase β is less than the second predetermined value, current phase β corresponding to flux linkage Ψp cannot be stably obtained.

Thus, when phase current peak value Ip is high, it is possible to stably obtain current phase β by using a first region of the curve CA1, in which current phase β is less than or equal to the first predetermined value (30 degrees), and a second region of the curve CB1, in which current phase β is greater than or equal to the second predetermined value (0 degrees), and this ultimately makes it possible to stably determine rotor position θm. Furthermore, as a switching point for switching between a case in which the curve CA1 is used (i.e., the first rotor position determining unit 19 that uses the data table TA), and a case in which the curve CB1 is used (i.e., the second rotor position determining unit 20 that uses the data table TB), a freely chosen current phase β in a range from the second predetermined value (0 degrees) to the first predetermined value (30 degrees), which is a range in which the first region of the curve CA1 and the second region of the curve CB1 overlap, may be used.

Referring to FIG. 5, the curves CA2 and CA3 indicating cases in which phase current peak value Ip is medium have stable tendencies in a region in which current phase β is less than or equal to a third predetermined value (here, 60 degrees), so that it is possible to stably obtain current phase β corresponding to [(induced voltage electrical angle θe)−(phase current electrical angle θi)]. However, each of the curves CA2 and CA3 has a point of change at which tendencies greatly change in a region in which current phase β exceeds the third predetermined value, and moreover, the tendencies in the curves CA2 and CA3 are opposite. Thus, in the region in which current phase β exceeds the third predetermined value, current phase β corresponding to [(induced voltage electrical angle θe)−(phase current electrical angle θi)] cannot be stably obtained.

On the other hand, referring to FIG. 6, similarly to the curve CB1, the curves CB2 and CB3 indicating cases in which phase current peak value Ip is medium has stable tendencies in a region in which current phase β is greater than or equal to the second predetermined value (0 degrees). However, each of the curves CB2 and CB3 has a point of change at which tendencies greatly change in a region in which current phase β is less than the second predetermined value.

Thus, when phase current peak value Ip is medium, it is possible to stably obtain current phase β by using a third region of the curves CA2 and CA3, in which current phase β is less than or equal to the third predetermined value (60 degrees), and a fourth region of the curves CB2 and CB3, in which current phase β is greater than or equal to the second predetermined value (0 degrees), and this ultimately makes it possible to stably determine rotor position θm. Furthermore, as a switching point for switching between a case in which the curves CA2 and CA3 are used (i.e., the first rotor position determining unit 19), and a case in which the curves CB2 and CB3 are used (i.e., the second rotor position determining unit 20), a freely chosen current phase β in a range from the second predetermined value (0 degrees) to the third predetermined value (60 degrees), which is a range in which the third region of the curves CA2 and CA3 and the fourth region of the curves CB2 and CB3 overlap, may be used.

Furthermore, referring to FIG. 5, the curve CA4 indicating a case in which phase current peak value Ip is low has a generally stable tendency. On the other hand, referring to FIG. 6, the curve CB4 indicating a case in which phase current peak value Ip is low has a stable tendency in a region in which current phase β is less than or equal to the third predetermined value (60 degrees). However, the curve CB4 has a point of change at which tendencies greatly change in a region in which current phase β exceeds the third predetermined value.

Thus, when phase current peak value Ip is low, it is possible to stably obtain current phase β by using the curve CA4, and this ultimately makes it possible to stably determine rotor position θm.

Thus, in the present embodiment, it is configured so that the selecting unit 21 monitors phase current peak value Ip and current phase β (first current phase β1, second current phase β2), and based on these values, the selecting unit 21 selects the first rotor position determining unit 19 or the second rotor position determining unit 20.

Figure 7:
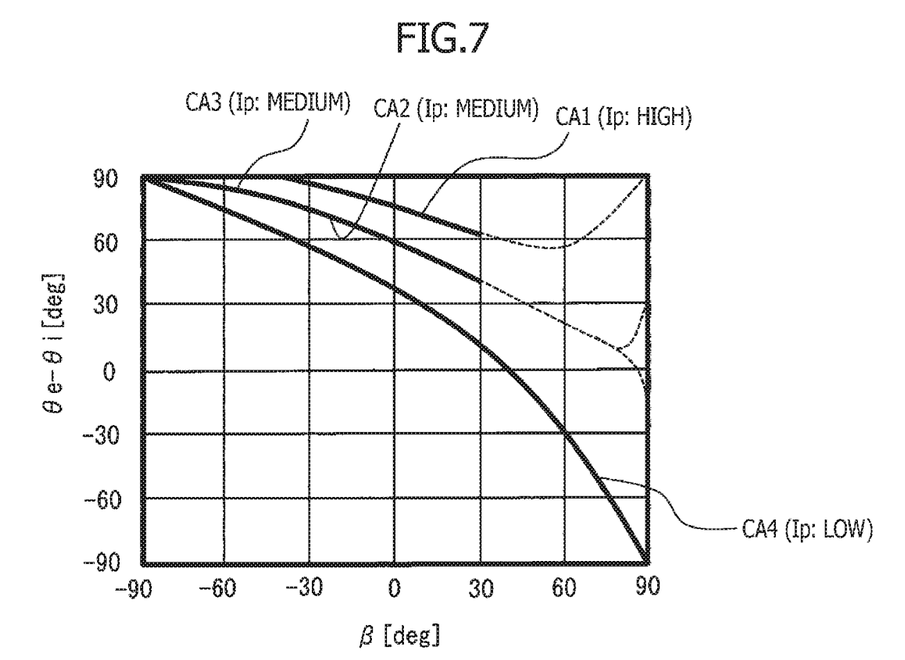
FIG. 7 is a diagram illustrating an example of the data table used in the first rotor position determining unit.
Figure 8:
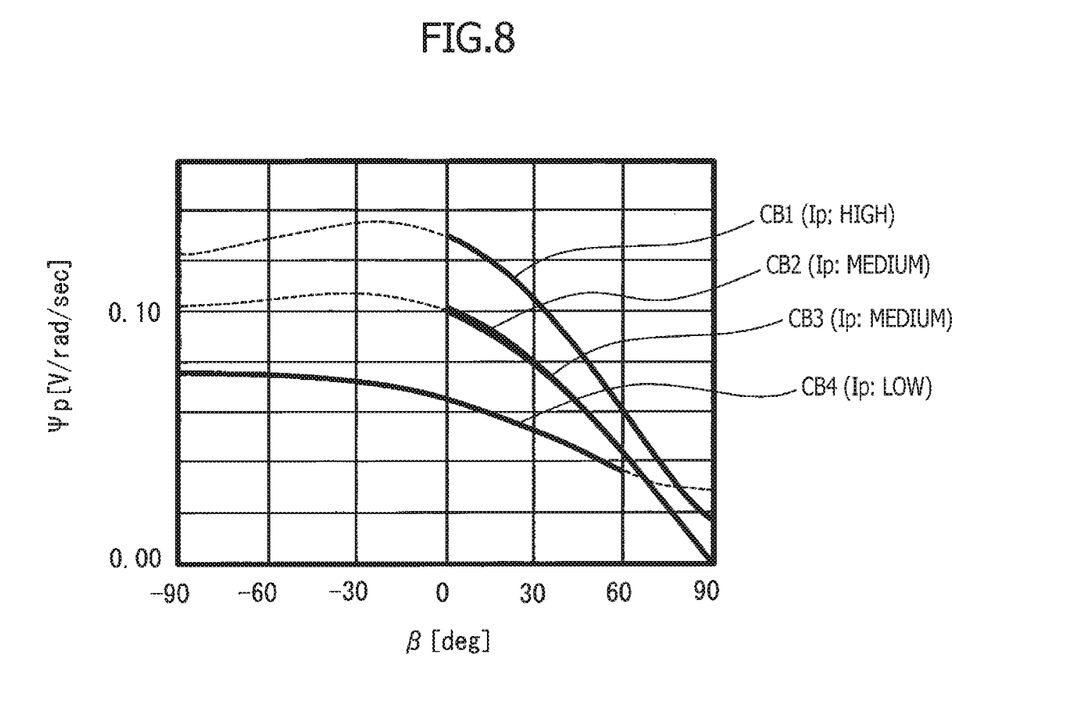
FIG. 8 is a diagram illustrating an example of the data table used in the second rotor position determining unit.

Preferably, as shown in FIG. 7, the data table TA that does not cover a region in which current phase β exceeds the first predetermined value (30 degrees) when phase current peak value Ip is high or medium (broken line), is generated, and, as shown in FIG. 8, the data table TB that does not cover a region in which current phase β exceeds the third predetermined value (60 degrees) when phase current peak value Ip is low (broken line), and a region in which current phase β is less than the second predetermined value (0 degrees) when phase current peak value Ip is high or medium (broken line), is generated, and then, the selecting unit 21 executes the process for selecting the first rotor position determining unit 19 or the second rotor position determining unit 20, as described later.

Figure 9:
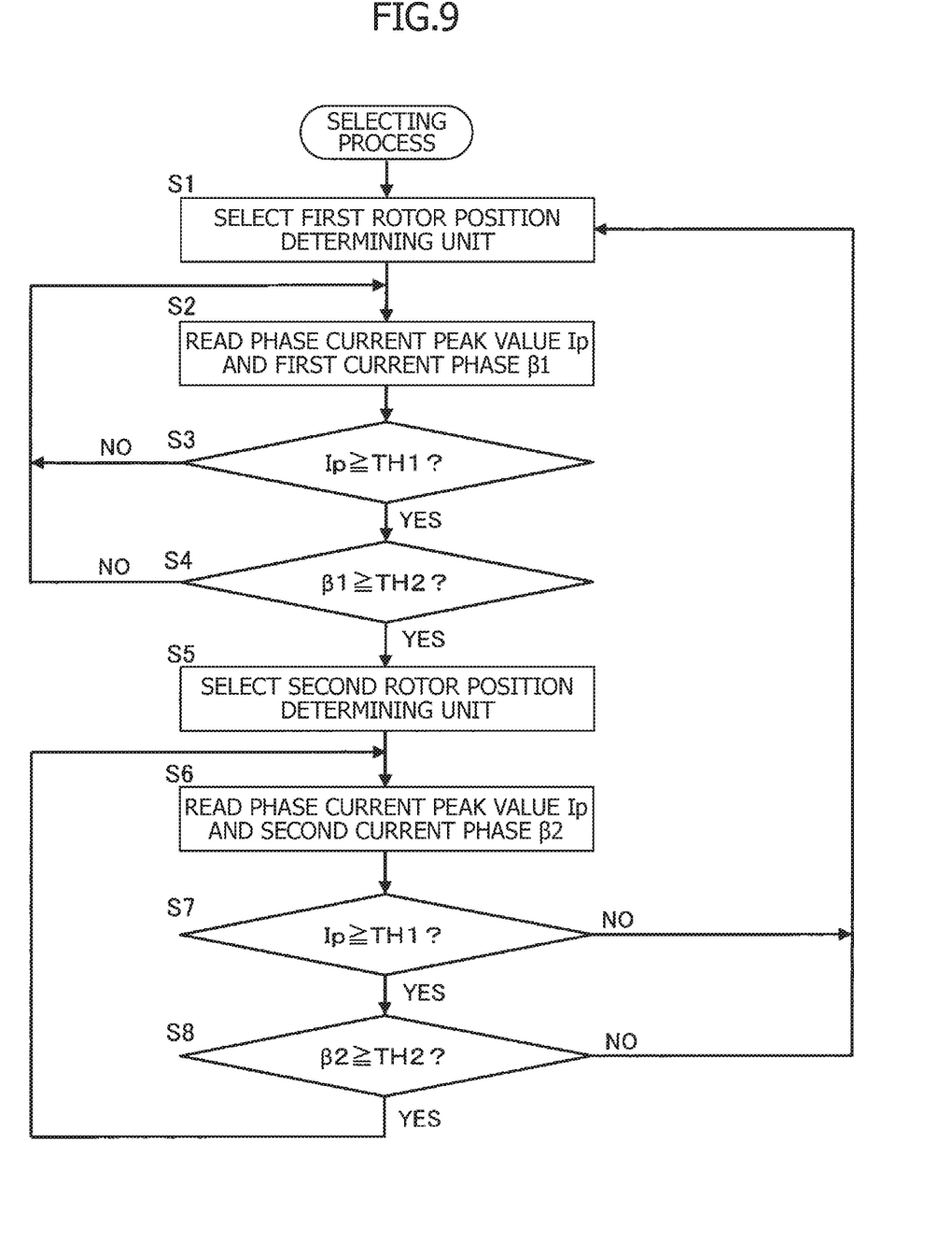
FIG. 9 is a flowchart illustrating an example of a process for selecting the first rotor position determining unit or the second rotor position determining unit, executed by a selecting unit.

FIG. 9 is a flowchart illustrating an example of the process for selecting the first rotor position determining unit 19 or the second rotor position determining unit 20, executed by the selecting unit 21. This flowchart starts in response to the startup completion signal output from the startup processing unit 11.

In step S1, the first rotor position determining unit 19 is selected. That is, in the present embodiment, the selecting unit 21 first selects the first rotor position determining unit 19 when the startup of the synchronous motor 2 is completed. This is because phase current peak value Ip is usually low immediately after the completion of startup of the synchronous motor 2, and this allows the first rotor position determining unit 19 that uses the data table TA to stably determine rotor position θm.

In step S2, phase current peak value Ip and first current phase β1 are read. Phase current peak value Ip read in this step is phase current peak value Ip which is most recently determined by the phase-current-peak-value-and-electrical-angle determining unit 16, and first current phase β1 read in this step is first current phase β1 which is most recently selected by first rotor position determining unit 19.

In step S3, it is determined whether phase current peak value Ip is greater than or equal to first threshold TH1. When phase current peak value Ip is greater than or equal to first threshold TH1, the process proceeds to step S4, whereas when phase current peak value Ip is less than first threshold TH1, the process returns to step S2. In the present embodiment, first threshold TH1 may be set to any value of 30 A or less.

Here, phase current peak value Ip compared with first threshold TH1 in step S3 is typically phase current peak value Ip which is read in step S2, that is, phase current peak value Ip which is most recently determined by the phase-current-peak-value-and-electrical-angle determining unit 16. However, the present invention is not limited thereto, and an average value (arithmetic average value, weighted average value) or a latest moving average value obtained from latest or previous phase current peak values Ip by the phase-current-peak-value-and-electrical-angle determining unit 16 may be used for phase current peak value Ip compared with first threshold TH1.

In step S4, it is determined whether first current phase β1 is greater than or equal to second threshold TH2. When first current phase β1 is greater than or equal to second threshold TH2, the process proceeds to step S5, whereas when first current phase β1 is less than second threshold TH2, the process returns to step S2. In the present embodiment, second threshold TH2 is set to any value in a range from the second predetermined value (0 degrees) to the first predetermined value (30 degrees).

Here, first current phase β1 compared with second threshold TH2 in step S4 is typically first current phase β1 which is read in step S2, that is, first current phase β1 which is most recently selected by the first rotor position determining unit 19. However, the present invention is not limited thereto, and an average value (arithmetic average value, weighted average value) or a latest moving average value obtained from latest or previous first current phases β1 by the first rotor position determining unit 19 may be used for first current phase β1 compared with second threshold TH2.

In step S5, the second rotor position determining unit 20 is selected. That is, the selecting unit 21 selects the second rotor position determining unit 20, in place of the first rotor position determining unit 19, so that the determining unit for determining rotor position θm is switched from the first rotor position determining unit 19 to the second rotor position determining unit 20.

In step S6, phase current peak value Ip and second current phase β2 are read. Phase current peak value Ip read in this step is phase current peak value Ip which is most recently determined by the phase-current-peak-value-and-electrical-angle determining unit 16, and second current phase β2 read in this step is second current phase β2 which is most recently selected by second rotor position determining unit 20.

In step S7, similarly to step S3, it is determined whether phase current peak value Ip is greater than or equal to first threshold TH1. When phase current peak value Ip is greater than or equal to first threshold TH1, the process proceeds to step S8. On the other hand, when phase current peak value Ip is less than first threshold TH1, the process returns to step S1, and the first rotor position determining unit 19 is selected. That is, the selecting unit 21 selects the first rotor position determining unit 19, in place of the second rotor position determining unit 20, so that the determining unit for determining rotor position θm is switched from the second rotor position determining unit 20 to the first rotor position determining unit 19.

Here, phase current peak value Ip compared with first threshold TH1 in step S7 is typically phase current peak value Ip which is read in step S6, that is, phase current peak value Ip which is most recently determined by the phase-current-peak-value-and-electrical-angle determining unit 16. However, the present invention is not limited thereto, and an average value (arithmetic average value, weighted average value) or a latest moving average value obtained from latest or previous phase current peak values Ip by the phase-current-peak-value-and-electrical-angle determining unit 16 may be used for phase current peak value Ip compared with first threshold TH1.

In step S8, it is determined whether second current phase β2 is greater than or equal to second threshold TH2. When second current phase β2 is greater than or equal to second threshold TH2, the process returns to step S6. That is, the state in which the second rotor position determining unit 20 is selected continues. On the other hand, when second current phase β2 is less than second threshold TH2, the process returns to step S1. That is, the selecting unit 21 selects the first rotor position determining unit 19, in place of the second rotor position determining unit 20, so that the determining unit for determining rotor position θm is switched from the second rotor position determining unit 20 to the first rotor position determining unit 19.

Here, second current phase β2 compared with second threshold TH2 in step S8 is typically second current phase β2 which is read in step S6, that is, second current phase β2 which is most recently selected by the second rotor position determining unit 20. However, the present invention is not limited thereto, and an average value (arithmetic average value, weighted average value) or a latest moving average value obtained from latest or previous second current phases β2 by the second rotor position determining unit 20 may be used for second current phase β2 compared with second threshold TH2.

Thus, in the present embodiment, the selecting unit 21 is configured to select the first rotor position determining unit 19 or the second rotor position determining unit 20, based on phase current peak value Ip and current phase β (first current phase β1, second current phase β2). Specifically, the selecting unit 21 is configured so that, after selecting the first rotor position determining unit 19, the selecting unit 21 selects the second rotor position determining unit 20, in place of the first rotor position determining unit 19, when phase current peak value Ip is greater than or equal to first threshold TH1, and first current phase β1 is greater than or equal to second threshold TH2. Furthermore, the selecting unit 21 is configured so that, after selecting the second rotor position determining unit 20, the selecting unit 21 selects the first rotor position determining unit 19, in place of the second rotor position determining unit 20, when phase current peak value Ip is less than first threshold TH1 or second current phase β2 is less than second threshold TH2.

Thus, selection of the first rotor position determining unit or the second rotor position determining unit, in particular, switching from the first rotor position determining unit 19 to the second rotor position determining unit 20 and switching from the second rotor position determining unit 20 to the first rotor position determining unit 19 are appropriately performed, so that it is possible to prevent obtaining erroneous rotor position θm. This provides a stable and accurate determination of rotor position θm in both the normal-control region and the flux-weakening-control region, so that it is possible to stably control the synchronous motor 2 by the motor control device 1.

Furthermore, in the present embodiment, the selecting unit 21 is configured to select the first rotor position determining unit 19 when receiving the start completion signal output from the startup processing unit 11, that is, when startup of the synchronous motor 2 is completed. Therefore, it is possible to rapidly shift from the startup process to the normal control that is performed based on the rotor position θm.

In addition, in the foregoing embodiment, the selecting unit 21 is configured to select the first rotor position determining unit 19 when receiving the startup completion signal output from the startup processing unit 11. However, the present invention is not limited thereto. The selecting unit 21 may be configured to select the first rotor position determining unit 19 when the synchronous motor 2 starts up. In this case, the startup processing unit 11 executes the startup process of the synchronous motor 2 when receiving the operation command output from the exterior while the synchronous motor 2 is stopped, and the startup processing unit 11 outputs a startup activating signal to the selecting unit 21. The selecting unit 21 is configured to then start the selecting process, shown in FIG. 9, when receiving the startup activating signal.

Although the embodiment and modifications of the present invention have been described in the foregoing, the present invention is not limited thereto, and further modifications and changes can be made based on the technical concept of the present invention.

REFERENCE SYMBOL LIST

1 Motor control device
2 Synchronous motor
3 Inverter
11 Startup processing unit
12 Rotation control unit
13 Inverter driving unit
14 Phase current determining unit (current determining unit)
15 Applied voltage determining unit
16 Phase-current-peak-value-and-electrical-angle determining unit (current-peak-value-and-electrical-angle determining unit)
17 Induced-voltage-peak-value-and-electrical-angle determining unit
18 Flux linkage determining unit
19 First rotor position determining unit
20 Second rotor position determining unit

The invention claimed is:
1. A motor control device comprising:
a current determining unit that determines a current flowing through a stator coil of a synchronous motor;
an applied voltage determining unit that determines an applied voltage applied to the stator coil;
a current-peak-value-and-electrical-angle determining unit that determines a current peak value and a current electrical angle based on a current determined by the current determining unit;
an induced-voltage-peak-value-and-electrical-angle determining unit that determines an induced voltage peak value and an induced voltage electrical angle based on the current determined by the current determining unit and an applied voltage determined by the applied voltage determining unit;
a flux linkage determining unit that determines a flux linkage of a rotor of the synchronous motor based on the induced voltage peak value and a rotational speed of the synchronous motor;
a first rotor position determining unit that determines a rotor position of the synchronous motor based on the current electrical angle, and a first current phase obtained from the current peak value and a difference between the induced voltage electrical angle and the current electrical angle;
a second rotor position determining unit that determines a rotor position of the synchronous motor based on the current electrical angle, and a second current phase obtained from the flux linkage and the current peak value; and
a selecting unit that selects the first rotor position determining unit or the second rotor position determining unit, based on the current peak value, and the first current phase or the second current phase,
wherein, after selecting the first rotor position determining unit, the selecting unit selects the second rotor position determining unit, in place of the first rotor position determining unit, when the current peak value is greater than or equal to a first threshold, and the first current phase is greater than or equal to a second threshold, and
wherein, after selecting the second rotor position determining unit, the selecting unit selects the first rotor position determining unit, in place of the second rotor position determining unit, when the current peak value is less than the first threshold, or the second current phase is less than the second threshold.
2. The motor control device according to claim 1, wherein the selecting unit selects the first rotor position determining unit, when the synchronous motor starts up or when startup of the synchronous motor is completed.

* * * * *